United States Patent
Hoshino (10) Patent No.: US 11,719,143 B2
(45) Date of Patent: Aug. 8, 2023

(54) VEHICLE ENGINE CONTROL APPARATUS

(71) Applicant: TOYOTA JIDOSHA KABUSHIKI KAISHA, Aichi-ken (JP)

(72) Inventor: Yu Hoshino, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/668,313

(22) Filed: Feb. 9, 2022

(65) Prior Publication Data

US 2022/0268188 A1    Aug. 25, 2022

(30) Foreign Application Priority Data

Feb. 12, 2021   (JP) .................................. 2021-020599

(51) Int. Cl.
| | | |
|---|---|---|
| *F01N 3/023* | (2006.01) | |
| *F02D 41/02* | (2006.01) | |
| *F02D 41/12* | (2006.01) | |
| *B60H 1/04* | (2006.01) | |
| *B60H 1/00* | (2006.01) | |

(52) U.S. Cl.
CPC .......... *F01N 3/023* (2013.01); *F02D 41/024* (2013.01); *F02D 41/123* (2013.01); *B60H 1/00664* (2013.01); *B60H 1/04* (2013.01); *F02D 2200/50* (2013.01)

(58) Field of Classification Search
CPC ...... F01N 3/023; F02D 41/024; F02D 41/123; F02D 2200/50; B60H 1/00664; B60H 1/04
See application file for complete search history.

(56) References Cited

U.S. PATENT DOCUMENTS

2020/0215874 A1    7/2020   Shibamoto et al.

FOREIGN PATENT DOCUMENTS

| JP | 2003278575 A | * | 10/2003 | .......... F02N 11/0829 |
| JP | 2009208619 A | * | 9/2009 | .......... B60H 1/00778 |
| JP | 2020112037 A |   | 7/2020 | |

OTHER PUBLICATIONS

Machine Translation of JP2009208619A PDF File Name: "JP2009208619A_Machine_Translation.pdf".*
Machine Translation of JP2003278575A PDF File Name: "JP2003278575A_Machine_Translation.pdf".*

* cited by examiner

*Primary Examiner* — Grant Moubry
*Assistant Examiner* — Ruben Picon-Feliciano
(74) *Attorney, Agent, or Firm* — Hauptman Ham, LLP (57) ABSTRACT

During operation under fuel cutoff control, the fuel cutoff control is interrupted when a decrease in temperature of cooling water from a temperature of cooling water that is detected at a start of the fuel cutoff control reaches or exceeds a second specified value under conditions that a degree of opening of an air mix door is greater than or equal to a predetermined opening degree and that a temperature setting is not raised in an operation unit.

4 Claims, 5 Drawing Sheets

| WATER TEMPERATURE [°C] | 40 | 50 | 60 | 70 | 80 | 85 |
|---|---|---|---|---|---|---|
| FIRST SPECIFIED VALUE | 0 | 3 | 4 | 5 | 6 | 6 |

FIG. 4A

| WATER TEMPERATURE [°C] | 40 | 50 | 60 | 70 | 80 | 85 |
|---|---|---|---|---|---|---|
| SECOND SPECIFIED VALUE | 0 | 6 | 8 | 10 | 12 | 12 |

VEHICLE ENGINE CONTROL APPARATUS

CROSS REFERENCE TO RELATED APPLICATION

This application claims priority to Japanese Patent Application No. 2021-020599 filed on Feb. 12, 2021, which is incorporated herein by reference in its entirety including the specification, claims, drawings, and abstract.

TECHNICAL FIELD

The present disclosure relates to an engine control apparatus which burns particulate matter in an exhaust gas collected through a filter, to regenerate the filter.

BACKGROUND

Filters for collecting particulate matter contained in an exhaust gas from an engine have been well known. There has also been known fuel cutoff control which is performed to regenerate the filter by stopping fuel supply to the engine and accordingly directing high temperature air to the filter to burn particulate matter accumulated on the filter (see, for example, JP 2020-112037 A).

In operation of the fuel cutoff control described in JP 2020-112037 A, the fuel cutoff control is interrupted when a decrease of a temperature of engine cooling water from that detected at the start of the fuel cutoff control reaches or exceeds a predetermined value during heating of a vehicle compartment under the fuel cutoff control. In this way, heating capability can be maintained in a case where the fuel cutoff control is applied during heating of the vehicle compartment.

During heating of the vehicle compartment, however, the vehicle compartment is assumed to be comfortable unless a passenger changes a temperature setting to a higher temperature. According to the fuel cutoff control described in JP 2020-112037 A, however, even when the vehicle compartment is assumed to be comfortable during heating of the vehicle compartment, the fuel cutoff control is always interrupted regardless of such a comfortable state, which in some cases may result in a situation that the filter cannot be regenerated during heating.

Under the circumstances, the present disclosure is directed to provide a vehicle engine control apparatus capable of regenerating a filter even during heating of a vehicle compartment as long as the vehicle compartment is in a comfortable state.

SUMMARY

In an aspect of this disclosure, an engine control apparatus for a vehicle includes an engine equipped with a filter for collecting particulate matter contained in an exhaust gas, an air conditioner which is equipped with an air mix door for opening and closing a channel through which air heated by cooling water for the engine flows and configured to air-condition a vehicle compartment, an air conditioner control apparatus which is equipped with an operation unit in which a temperature setting for the vehicle compartment can be changed and configured to control the air conditioner, a cooling water temperature sensor configured to detect a temperature of cooling water for the engine, and a controller which is configured to stop fuel supply to the engine and feed high temperature air to the filter in order to burn particulate matter accumulated on the filter, in which the controller is further configured to interrupt the fuel cutoff control when a decrease in temperature of cooling water from a temperature of cooling water detected at a start of the fuel cutoff control matches or exceeds a first specified value under conditions that a degree of opening of the air mix door is greater than or equal to a predetermined opening degree and that the temperature setting in the operation unit is changed to a higher temperature during operation under the fuel cutoff control, or to interrupt the fuel cutoff control when the decrease in temperature of cooling water from the temperature of cooling water detected at the start of the fuel cutoff control matches or exceeds a second specified value under conditions that the degree of opening of the air mix door is greater than or equal to the predetermined opening degree and that the temperature setting in the operation unit is not changed to the higher temperature during operation under the fuel cutoff control, and the second specified value is greater than or equal to the first specified value.

In the engine control apparatus for a vehicle according to another aspect of this disclosure, after the fuel cutoff control is interrupted, the controller may resume the fuel cutoff control when the temperature of cooling water is returned to the temperature of cooling water detected at the start of the fuel cutoff control.

In the engine control apparatus for a vehicle according to another aspect of this disclosure, the first specified value and the second specified value may be increased as the temperature of cooling water becomes higher.

According to the engine control apparatus for a vehicle of this disclosure, the filter can be regenerated even during heating of the vehicle compartment as long as the vehicle compartment is in the comfortable state. In this way, a length of time for regenerating the filter can be extended from that in the related art.

BRIEF DESCRIPTION OF DRAWINGS

Embodiments of the present disclosure will be described based on the following figures, wherein.

DESCRIPTION OF EMBODIMENTS

Hereinafter, an example of an embodiment according to the present disclosure is described in detail. In the following description, specific shapes, materials, directions, numerical values, and other features are described by way of illustration to facilitate understanding of this disclosure, and may be changed as appropriate depending on applications, purposes, and specifications, for example.

Figure 1:
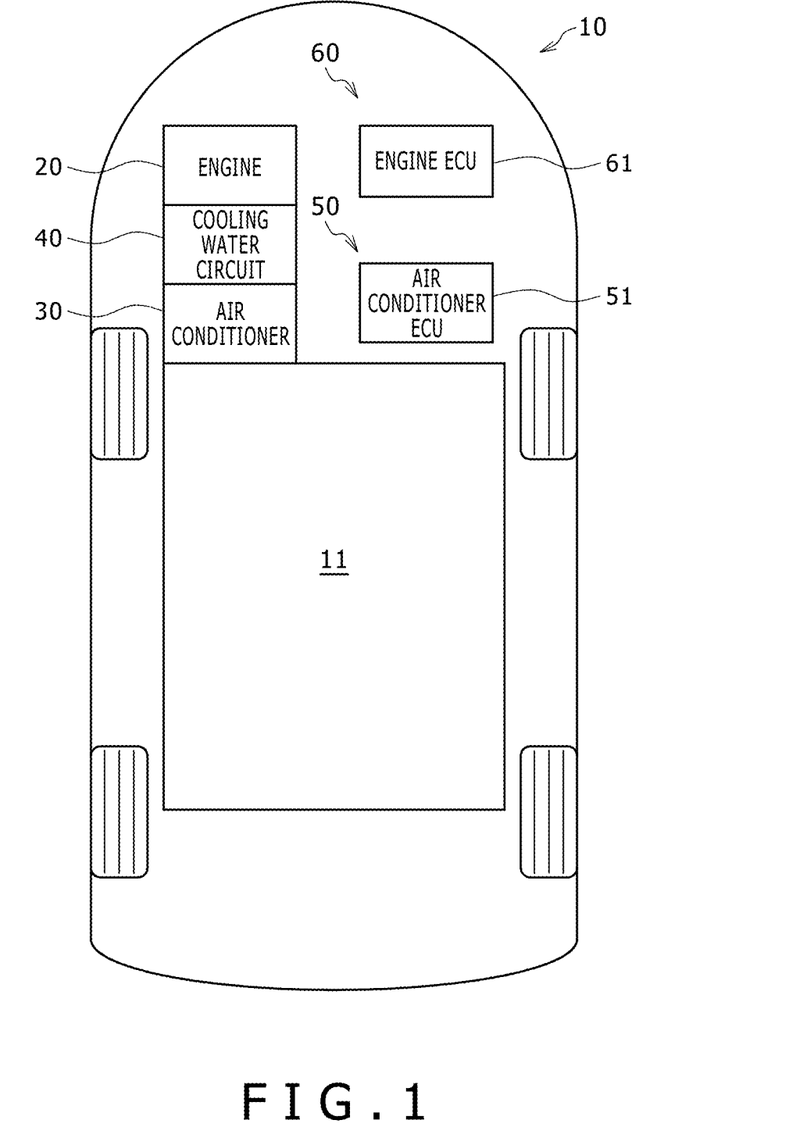
FIG. 1 is a schematic diagram showing a vehicle according to an embodiment.

A vehicle 10 equipped with an engine control apparatus 60 according to an example of the embodiment is described with reference to FIGS. 1 and 2. FIG. 1 schematically shows the vehicle 10, and FIG. 2 schematically shows an engine 20 and an air conditioner 30.

As shown in FIG. 1, the engine control apparatus 60 is installed in the vehicle 10. The vehicle 10 includes the engine 20 for traveling, the air conditioner 30 for conditioning air within a vehicle compartment 11, a cooling water circuit 40 for cooling the engine 20 and heating air in the air conditioner 30, an air conditioner control apparatus 50 which has an air conditioning ECU (Electronic Control Unit) 51 and controls the air conditioner 30, and the engine control apparatus 60 which has an engine ECU (Electronic Control Unit) 61 functioning as a controller and controls the engine 20.

The vehicle 10 is a vehicle which is driven by means of the engine 20 as a power source, while the vehicle 10 may be a hybrid electric vehicle which is driven, for example, by means of both the engine 20 and a motor as power sources. The engine 20 is a gasoline engine, while the engine 20 may be a diesel engine.

Figure 2:
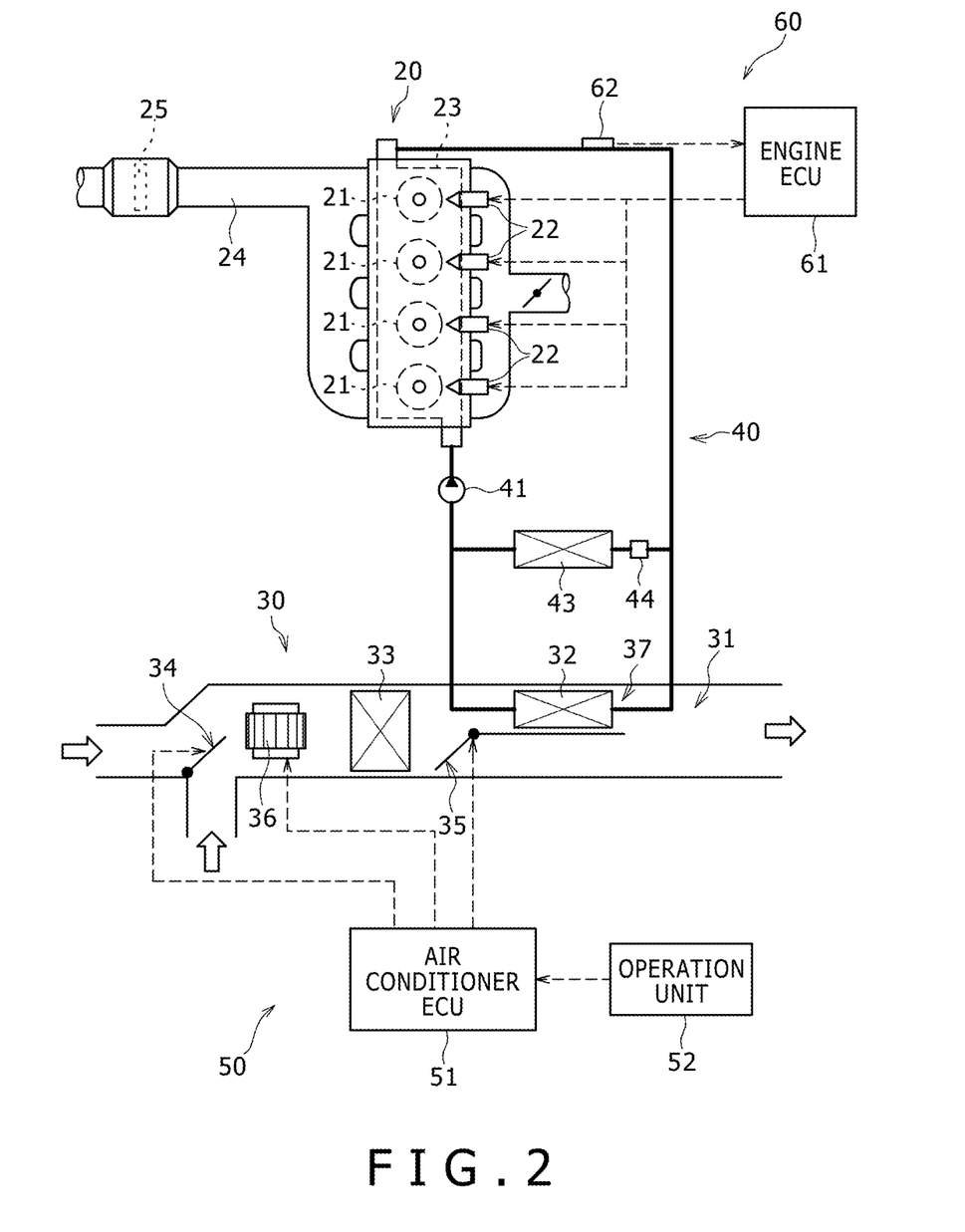
FIG. 2 is a schematic diagram showing an engine and an air conditioner.

As shown in FIG. 2, the engine 20 has a plurality of (four in the illustrated exampled) cylinders 21, fuel injection valves 22 for injecting a fuel into intake air, a water jacket 23 disposed around cylinder bodies, an exhaust pipe 24 for directing an exhaust gas to the outside, and a filter 25 disposed in the exhaust pipe 24 to collect particulate matter in the exhaust gas.

The water jacket 23 is disposed so as to surround the cylinder bodies and function as a passage of cooling water for cooling the engine 20, and is connected to the cooling water circuit 40. The filter 25 is regenerated by burning accumulated particulate matter through fuel cutoff control which will be described in detail below.

The air conditioner 30 includes an air duct 31 through which air is conditioned and fed into the vehicle compartment 11, a heater core 32 connected to the cooling water circuit 40, an evaporator 33 connected to a freeze cycle circuit, an inside and outside air switching door 34 for switching between intake of air (inside air) from the vehicle compartment 11 and intake of air (outside air) from outside the vehicle 10, an air mix door 35 functioning as an opening and closing door which is opened and closed to regulate a volume of air directed to the heater core 32, and an air blower 36 for creating an air flow through the air duct 31.

The air duct 31 is a passage through which heated and/or cooled air is conditioned and made to flow into the vehicle compartment 11. The air duct 31 includes a heated air duct 37 which is arranged at a certain position in the air duct 31 and equipped with the heater core 32 for allowing air heated in the heater core 32 to flow through the heated air duct 37.

The air mix door 35 is a door for opening and closing the heated air duct 37. In other words, the air mix door 35 functions to adjust a level of heating operation for heating the vehicle compartment 11 during air conditioning by the air conditioner 30. For example, when a degree of opening of the air mix door 35 is 100%, the heated air duct 37 is in a fully opened state. In this state, power of heating the vehicle compartment 11 reaches the maximum capacity. On the other hand, when the degree of opening of the air mix door 35 is 0%, the heated air duct 37 is in a fully closed state. In this state, the power of heating the vehicle compartment 11 becomes zero.

The cooling water circuit 40 is configured to utilize exhaust heat from the engine 20 for the heating operation of the air conditioner 30 by means of cooling water as a heating medium. The cooling water circuit 40 includes the above-described water jacket 23, a cooling water pump 41 for circulating the cooling water through the cooling water circuit 40, the below-described heater core 32, a radiator 43 for exchanging heat between outside air and the cooling water, and a thermostat 44 whose degree of opening is adjusted depending on temperatures of the cooling water passing through the thermostat 44.

Figure 3:
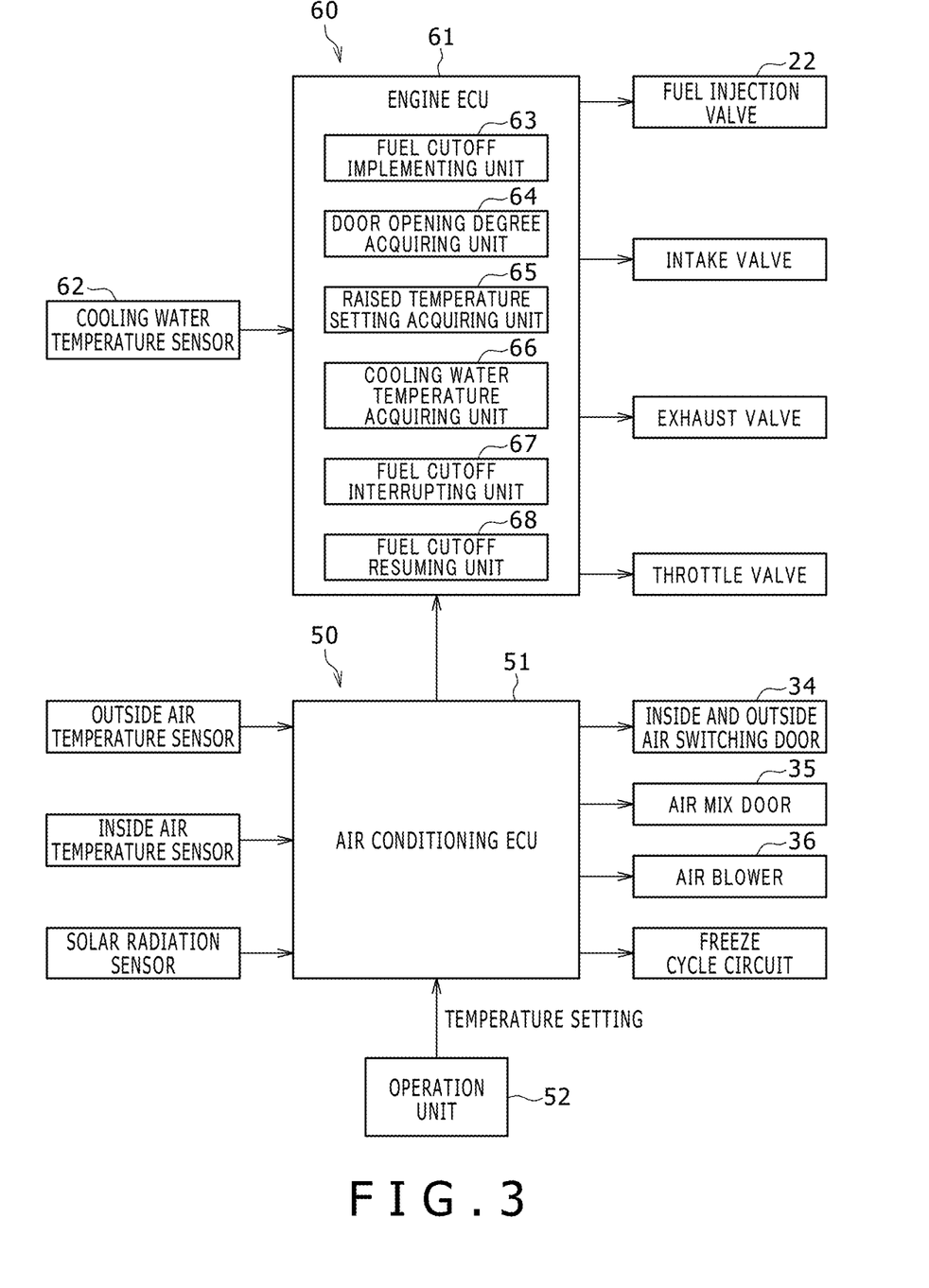
FIG. 3 is a block diagram showing an engine control apparatus according to an exemplary embodiment and an air conditioner control apparatus.
Figure 4A:
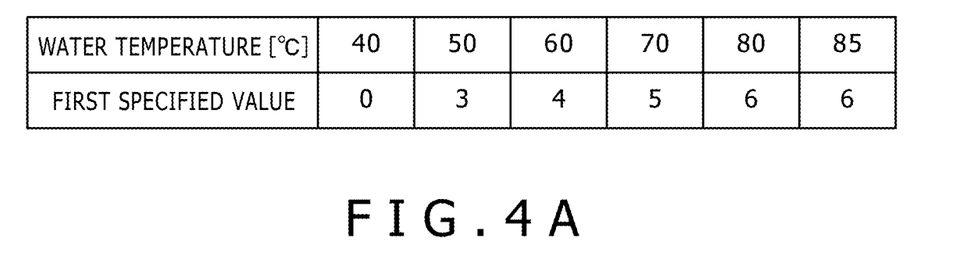
FIG. 4A shows a table indicating cooling water temperatures and first specified values.
Figure 4B:
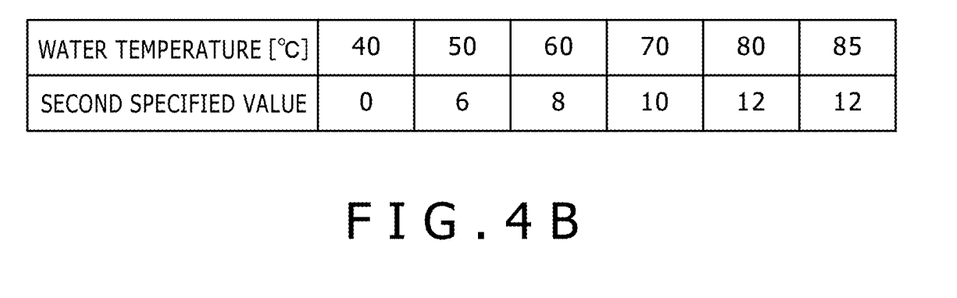
FIG. 4B shows a table indicating the cooling water temperatures and second specified values.

Referring to FIGS. 2 to 4, the air conditioner control apparatus 50 and the engine control apparatus 60 are described. FIG. 3 is a block diagram showing a configuration of the air conditioner control apparatus 50 and the engine control apparatus 60. FIG. 4A is a table showing cooling water temperatures and first specified values, and FIG. 4B is a table showing the cooling water temperatures and second specified values.

As shown in FIG. 2, the air conditioner control apparatus 50 is configured to control the air conditioner 30. The air conditioner control apparatus 50 includes the air conditioning ECU 51, which will be described in detail below, an operation unit 52 installed within the vehicle compartment 11 for allowing a passenger to change at least a temperature setting for the vehicle compartment 11, and sensors, such as an inside air temperature sensor, an outside air temperature sensor, and a solar radiation sensor, which are shown in FIG. 3.

As shown in FIG. 3, the air conditioning ECU 51 includes a computation processor composed of a CPU (Central Processing Unit), and a storage composed of a RAM (Random Access Memory), a ROM (Read Only Memory), and the like, and is configured to perform signal processing in accordance with a program previously stored in the ROM while using a temporary memory function of the RAM.

The air conditioning ECU 51 is connected to the operation unit 52, the inside air temperature sensor, the outside air temperature sensor, the solar radiation sensor, and other components, to receive signals transmitted from these sensors and components. Further, the air conditioning ECU 51 is also connected to the inside and outside air switching door 34, the air mix door 35, the air blower 36, devices in the freeze cycle circuit, the engine ECU 61, and other components, to transmit signals to the devices and components.

The air conditioning ECU 51 computes a target blowoff temperature of air which is blown from a blowoff port in the air duct 31 toward the vehicle compartment 11, based on the temperature setting for the vehicle compartment 11 specified through the operation unit 52, a temperature of the vehicle compartment 11 detected by the inside air temperature sensor, a temperature of air outside the vehicle 10 detected by the outside air temperature sensor, and a solar radiation amount detected by the solar radiation sensor. To realize the computed target blowoff temperature, the air conditioning ECU 51 adjusts the cooling water pump 41 in the cooling water circuit 40, the devices in the freeze cycle circuit, the degree of opening of the inside and outside air switching door 34, and the degree of opening of the air mix door 35.

As shown in FIG. 2, the engine control apparatus 60 is configured to control the engine 20. The engine control apparatus 60 includes the engine ECU 61, which will be described in detail below, and a cooling water temperature sensor 62 for detecting a temperature of the cooling water for the engine 20. The cooling water temperature sensor 62 is installed at a position downstream of the water jacket 23 and upstream of the heater core 32 in the cooling water circuit 40.

As shown in FIG. 3, the engine ECU 61 includes a computation processor composed of a CPU (Central Processing Unit), and a storage composed of a RAM (Random Access Memory), a ROM (Read Only Memory), and the like, and is configured to perform signal processing in accordance with a program previously stored in the ROM while using a temporary memory function of the RAM.

The engine ECU 61 is connected to the cooling water temperature sensor 62, the air conditioning ECU 51, and other components, to receive signals transmitted from the sensors and components. Further, the engine ECU 61 is also connected to a throttle valve, an intake valve, an exhaust valve, the fuel injection valves 22 for the respective cylinders 21, and other components, to transmit signals to the valves and components.

The engine ECU 61 has a function of performing fuel cutoff control to stop fuel supply from the fuel injection valve 22 and allow a crankshaft to be rotated only by the force of inertia of traveling for causing the cylinders to compress only air and feeding the compressed high temperature air into the filter 24 in order to burn particulate matter accumulated on the filter 25.

It should be noted that when the vehicle 10 is a hybrid electric vehicle, the fuel cutoff control may be performed in such a manner that fuel supply from the fuel injection valve 22 is stopped while the crankshaft is rotated by means of a motor connected to the engine 20 for causing the cylinders to compress only air and feeding the compressed high temperature air into the filter 25 in order to burn particulate matter accumulated on the filter 25.

The engine ECU 61 includes a fuel cutoff implementing unit 63 configured to implement the above-described fuel cutoff control, a door opening degree acquiring unit 64 configured to acquire a degree of opening of the air mix door 35 that is instructed by the air conditioning ECU 51, a raised temperature setting acquiring unit 65 configured to acquire a fact that the temperature setting is raised in the operation unit 52, a cooling water temperature acquiring unit 66 configured to acquire a temperature of cooling water for the engine 20 from the cooling water temperature sensor 62, a fuel cutoff interrupting unit 67 configured to interrupt the ongoing fuel cutoff control, and a fuel cutoff resuming unit 68 configured to resume the interrupted fuel cutoff control.

The fuel cutoff implementing unit 63 has a function of estimating an accumulation amount of particulate matter accumulated on the filter 25, and implementing the fuel cutoff control when the estimated accumulation amount reaches or exceeds a predetermined amount. The accumulation amount of particulate matter on the filter 25 may be estimated based on a differential pressure between pressures detected on upstream and downstream sides of the filter 25, or may be estimated based on driving conditions of the engine 20.

The fuel cutoff interrupting unit 67 has a function of interrupting the fuel cutoff control when a decrease in temperature of cooling water for the engine 20 from a temperature of cooling water detected at a start of the fuel cutoff control matches or exceeds a first specified value under conditions that the degree of opening of the air mix door 35 is greater than or equal to a predetermined opening degree (80% in this example) and that the temperature setting is raised in the operation unit during operation under the fuel cutoff control.

As shown in FIG. 4, the first specified value is defined to become greater as a present temperature of cooling water becomes higher. Further, the first specified value is also defined to be smaller than a below-described second specified value.

In a case where the passenger requests an increase in heating power in a state where the air conditioner 30 has been requested to perform heating operation at a predetermined load or greater under the fuel cutoff control, a decreased temperature of cooling water for the engine 20 may in some cases result in a reduced heating power. To prevent such reduction of the heating power, the fuel cutoff interrupting unit 67 interrupts the fuel cutoff control. In this way, passenger comfort can be ensured.

In addition, the fuel cutoff interrupting unit 67 further has a function of interrupting the fuel cutoff control when the decrease in temperature of cooling water for the engine 20 from the temperature detected at the start of the fuel cutoff control matches or exceeds a second specified value under conditions that the degree of opening of the air mix door 35 is greater than or equal to the predetermined opening degree (80% in this example) and that the temperature setting is not raised in the operation unit 52.

As shown in FIG. 4, the second specified value is defined to become greater as the present temperature of the cooling water becomes higher. The second specified value is also determined to be greater than or equal to the first specified value.

In a case where the passenger does not request the increase in heating power in a state where the air conditioner 30 has been requested to perform heating operation at the predetermined load or higher under the fuel cutoff control, the decreased temperature of cooling water for the engine 20 may in some cases result in reduced heating power. To prevent such reduction in heating power, the fuel cutoff interrupting unit 67 interrupts the fuel cutoff control. In this way, passenger comfort can be ensured.

In the case where the passenger does not request any increase in heating power, the fuel cutoff interrupting unit 67 interrupts the fuel cutoff control only when the temperature of cooling water for the engine 20 is decreased to an extent greater than that in a case where the increase in heating power is requested. This can ensure that regeneration of the filter 25 is continued while securing passenger comfort as long as the passenger does not request any increase in heating power.

The fuel cutoff resuming unit 68 has a function of resuming the fuel cutoff control when the temperature of cooling water for the engine 20 is returned to the temperature detected at the start of the fuel cutoff control after the fuel cutoff control is interrupted. This can ensure that regeneration of the filter 25 is continued for a possible longest period as long as the temperature of cooling water for the engine 20 is restored to a temperature capable of fulfilling the request for heating operation.

A flow of fuel cutoff control operation is described with reference to FIG. 5.

Figure 5:
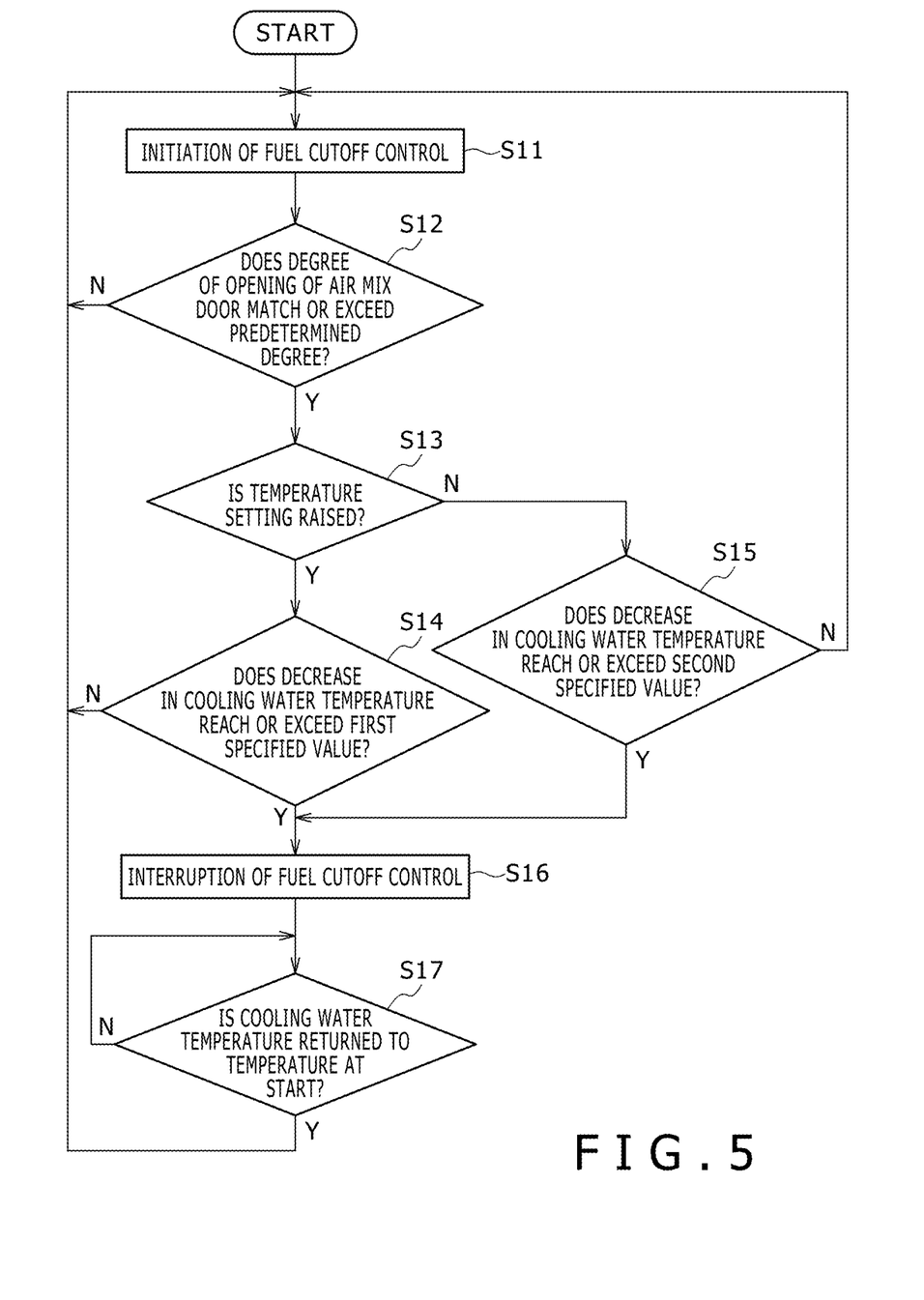
FIG. 5 is a flowchart showing a flow of fuel cutoff control.

As shown in FIG. 5, the fuel cutoff control is initiated in step S11. Then, in step S12, it is determined whether or not the degree of opening of the air mix door 35 is greater than or equal to the predetermined opening degree (80% in this example). When the degree of opening of the air mix door 35 is determined to be greater than or equal to the predetermined opening degree, operation moves to step S13, or when the degree of opening of the air mix is determined to be smaller than the predetermined opening degree, operation returns to step S11.

In step S13, a determination is made as to whether or not the temperature setting is raised in the operation unit 52 during operation under the fuel cutoff control. When the temperature setting is determined to be raised, operation moves to step S14, or when it is not determined to be raised, operation moves to step S15.

Then, it is determined in step S14 whether or not the decrease in temperature of cooling water for the engine 20 from the temperature detected at the start of fuel cutoff control matches or exceeds the first specified value. When the decrease is determined to match or exceed the first specified value, operation moves to step S16, or when it is determined to be smaller than the first specified value, operation returns to step S11.

In step S15, it is determined whether or not the decrease in temperature of cooling water for the engine 20 from the temperature detected at the start of the fuel cutoff control matches or exceeds the second specified value. When the decrease in temperature of cooling water for the engine 20 is determined to match or exceed the second specified value, operation moves to step S16, or when the decrease is determined to be smaller than the second specified value, operation returns to step S11.

In step S16, the fuel cutoff control is interrupted. In step S17, a determination is made as to whether or not the temperature of cooling water for the engine 20 is returned to the temperature detected at the start of the fuel cutoff control, and when the temperature is determined to be returned, the fuel cutoff control is resumed.

It should be noted that this disclosure is not limited to the above-described embodiment or modifications thereof, and may be changed or improved in various ways without departing from the scope of matter defined in the accompanying claims.

The invention claimed is:

1. An engine control apparatus for a vehicle, comprising:
   an engine including a filter for collecting particular matter contained in an exhaust gas, and a fuel injection valve for injecting a fuel into intake air;
   an air conditioner configured to air condition a vehicle compartment, the air conditioner comprising an air mix door configured to open and close a duct through which air heated by cooling water for the engine flows;
   an air conditioner control apparatus configured to control the air conditioner, the air conditioner control apparatus comprising an operation unit with which a temperature setting for the vehicle compartment can be changed;
   a cooling water temperature sensor configured to detect a temperature of the cooling water for the engine); and
   a controller configured to perform fuel cutoff control to stop fuel supply from the fuel injection valve to the engine to thereby allow a crankshaft to be rotated only by the force of inertia of traveling, to cause cylinders to compress only air, and to direct the compressed high temperature air to the filter to burn the particular matter accumulated on the filer, wherein
   the controller is further configured to
      interrupt the fuel cutoff control when a decrease in temperature of cooling water from a temperature of the cooling water that is detected at a start of the fuel cutoff control reaches or exceeds a first specified value under conditions that a degree of opening of the air mix door is greater than or equal to a predetermined opening degree and that the temperature setting is raised in the operation unit during operation under the fuel cutoff control; or
      interrupt the fuel cutoff control when the decrease in temperature of cooling water from the temperature of the cooling water that is detected at the start of the fuel cutoff control reaches or exceeds a second specified value under conditions that the degree of opening of the air mix door is greater than or equal to the predetermined opening degree and that the temperature setting is not raised in the operation unit during operation under the fuel cutoff control; and
   the second specified value is defined to be greater than or equal to the first specified value.

2. The engine control apparatus for a vehicle according to claim 1, wherein the controller is further configured to resume the fuel cutoff control when the temperature of the cooling water is returned to the temperature of the cooling water detected at the start of the fuel cutoff control after the fuel cutoff control is interrupted.

3. The engine control apparatus for a vehicle according to claim 1, wherein the first specified value and the second specified value are defined to increase in value as the temperature of the cooling water increases in magnitude.

4. The engine control apparatus for a vehicle according to claim 2, wherein the first specified value and the second specified value are defined to increase in value as the temperature of the cooling water increases in magnitude.

* * * * *

UNITED STATES PATENT AND TRADEMARK OFFICE
CERTIFICATE OF CORRECTION

| | |
|---|---|
| PATENT NO. | : 11,719,143 B2 |
| APPLICATION NO. | : 17/668313 |
| DATED | : August 8, 2023 |
| INVENTOR(S) | : Yu Hoshino |

It is certified that error appears in the above-identified patent and that said Letters Patent is hereby corrected as shown below:

On the Title Page

Item (73), Line 1 to 2, change "TOYOTA IIDOSHA KABUSHIKI KAISHA, Aichi-Ken (JP)" to
-- TOYOTA JIDOSHA KABUSHIKI KAISHA, Aichi-ken (JP) --

Signed and Sealed this
Tenth Day of October, 2023

Katherine Kelly Vidal
*Director of the United States Patent and Trademark Office*